(12) United States Patent
Lal et al.

(10) Patent No.: US 7,301,254 B1
(45) Date of Patent: Nov. 27, 2007

(54) HIGH EFFICIENCY RADIO ISOTOPE ENERGY CONVERTERS USING BOTH CHARGE AND KINETIC ENERGY OF EMITTED PARTICLES

(75) Inventors: Amit Lal, Ithaca, NY (US); Rajesh Duggirala, Ithaca, NY (US); Hui Li, Santa Clara, CA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 11/491,024

(22) Filed: Jul. 24, 2006

Related U.S. Application Data (60) Provisional application No. 60/701,506, filed on Jul. 22, 2005.

(51) Int. Cl.
  *H02N 1/00* (2006.01)
  *H02N 2/18* (2006.01)
  *H01L 41/08* (2006.01)
(52) U.S. Cl. .................. 310/309; 310/339; 376/320
(58) Field of Classification Search ................ 310/302, 310/305, 309, 339; 376/320
  See application file for complete search history.

(56) References Cited

U.S. PATENT DOCUMENTS

| | | | |
|---|---|---|---|
| 2,976,426 A * | 3/1961 | Rappaport | .................. 310/303 |
| 4,835,433 A | 5/1989 | Brown | |
| 5,079,469 A | 1/1992 | Bongianni | |
| 5,280,213 A | 1/1994 | Day | |
| 5,440,187 A | 8/1995 | Little et al. | |
| 5,590,162 A | 12/1996 | Terhune et al. | |
| 5,606,213 A | 2/1997 | Kherani et al. | |
| 5,608,767 A | 3/1997 | Terhune et al. | |
| 5,642,014 A | 6/1997 | Hillenius | |
| 5,721,462 A | 2/1998 | Shanks | |
| 5,825,839 A | 10/1998 | Baskis | |
| 5,859,484 A | 1/1999 | Mannik et al. | |
| 5,945,767 A | 8/1999 | Westlund | |

(Continued)

*Primary Examiner*—Thomas M. Dougherty
(74) *Attorney, Agent, or Firm*—Jones, Tullar & Cooper, PC (57) ABSTRACT

An electrical energy generator with improved efficiency has a base on which is mounted an elastically deformable micromechanical element that has a section that is free to be displaced toward the base. An absorber of radioactively emitted particles is formed on the base or the displaceable section of the deformable element and a source is formed on the other of the displaceable section or the base facing the absorber across a small gap. The radioactive source emits charged particles such as electrons, resulting in a buildup of charge on the absorber, drawing the absorber and source together and storing mechanical energy as the deformable element is bent. When the force between the absorber and the source is sufficient to bring the absorber into effective electrical contact with the source, discharge of the charge between the source and absorber allows the deformable element to spring back, releasing the mechanical energy stored in the element. An electrical generator of improved efficiency includes a first energy source comprising a piezoelectric transducer secured to the deformable element to convert the released mechanical energy to electrical energy. A second energy source comprises a betavoltaic cell carried on the deformable element or electron collector cantilever beam to provide a direct current (DC) power output that can be added to the piezo-electric circuit's alternating current (AC) power output, such that there is a continuous power output that can be used to provide power to electronic circuits.

12 Claims, 10 Drawing Sheets

U.S. PATENT DOCUMENTS 6,103,295 A    8/2000   Chan et al.
6,297,579 B1   10/2001  Martin et al.
6,479,920 B1   11/2002  Lal et al.

* cited by examiner

HIGH EFFICIENCY RADIO ISOTOPE ENERGY CONVERTERS USING BOTH CHARGE AND KINETIC ENERGY OF EMITTED PARTICLES

This application is a continuation of and claims priority to the filing date of U.S. provisional application Ser. No. 60/701,506 filed Jul. 22, 2005, the entire disclosure of which is incorporated herein by reference. This application is also related to U.S. Pat. No. 6,479,920, to Lal et al, ("the '920 patent") and for background and enablement purposes, the entire disclosure of the '920 patent is incorporated herein by reference.

The present invention was made at least partially with Government funds under DARPA Grant Nos. W31PQ4-04-1-R002 and DAAH 01-03-1-R001. The U.S. Government may have rights in this patent.

BACKGROUND OF THE INVENTION

1. Field of the Invention

The present invention relates to radioactive power sources and micromechanical and microelectromechanical (MEM) devices of improved efficiency.

2. Discussion of the Prior Art

Microelectromechanical (MEM) devices and microelectromechanical systems (MEMS) are being developed to accomplish a number of previously unattainable goals in systems that are smaller in volume and power consumption than systems contemplated in the prior art. Recently, it has become possible to fabricate charge and kinetic energy radioisotope energy converters in a smaller scale than previously possible. MEMS manufacturing techniques have been developed for the production of microelectromechanical systems using manufacturing technologies adapted from the manufacturing of integrated circuits and other electronic devices. Such MEMS structures may be formed of a variety of materials, including semiconductors used in integrated circuit manufacturing, such as silicon, various metals, and organic thin films. The small size of MEMS systems and the materials of which they are formed naturally offers the opportunity for the integration of these structures with integrated circuits to provide autonomous Microsystems. However, such systems still require a power source, and the utility of autonomous Microsystems has been hindered by the unavailability of suitable power sources that provide enough power while not greatly increasing the final volume of the system. Even the smallest conventional batteries may be much larger than the MEMS system being supplied with power, thus limiting the extent to which the size of the overall device can be shrunk. In addition, conventional batteries have a relatively short useful lifetime, typically on the order of days to weeks or at most months, whereas in some applications it would be desirable to have a power source capable of supplying power to the MEMS device for many months or even years. Suitable devices with sufficient lifetime would be useful for a variety of applications. For example, sensor systems placed over a large area may be utilized to monitor vibration and gas output of vehicles and report back the information to a central collection point via optical or radio frequency (RF) communications. The signals produced by the small autonomous sensors may be picked up and stored and amplified by a larger central system powered by conventional sources such as gasoline engines, fuel cells, or large batteries. Such sensors have also been proposed for use in battlefield monitoring and in commercial applications for sensing properties that affect component life such as viscosity, Young's modulus, vibration, etc. If such devices could be provided with power sources capable for operating for years or decades without replacement, the sensors could be embedded inside permanent casings such as walls of buildings, or could be utilized in space research as "microsatellites."

One proposed approach to providing long-lived power sources is the use of radioisotopes that generate electrical power in a nuclear "battery." Early approaches to such batteries are discussed in A. Thomas, "Nuclear Batteries: Types and Possible Uses," Nucleonics, Vol. 13, No. 11, November 1955. One approach to electric power generation from radioisotopes is based on charge particle collection. See, e.g., G. H. Miley, "Direct Conversion of Nuclear Radiation Energy," American Nuclear Society, 1970; L. C. Olsen, et al., "Betavoltaic Nuclear Electric Power Sources," Winter Meeting of the American Nuclear Society, San Francisco, Calif., 1969. Most of the nuclear battery designs are based on thermal effects, in which a volume of the source is self-heated due to highly energetic particle impacts, and the heat energy is then converted to electrical energy, with a typical efficiency of 4% to 15% (a quantity determined by the efficiency of the thermo-electric converter). Although such an approach is amenable to miniaturization, the need for thermal isolation and relatively high operating temperatures makes such devices suitable primarily where high power is required and where the high operating temperature and volume of heat produced is not problematic. Further, as devices shrink in size, the surface to volume ratio increases, with large losses from radiative and convective losses. In particular, the stopping depth for electrons or alpha particles in materials is usually in the range of a few microns to several tens of microns, indicating that the charged particle collector must be at least that many microns thick. This implies that the collector cannot be scaled down to a thickness less than the decay depth since otherwise the emitted particles simply pass through. Consequently, it is unlikely that traditional thermal conversion will work in microscale devices. Another approach for converting emitted charged particles to electric power is by the creation of electron-hole pairs by ionization in a semiconductor (e.g., silicon). In a depletion region electric field, the pairs can be separated to provide electric energy. This is essentially the same principle used in solar cells, where photons cause electron-hole pair generation. An advantage of the use of particles from nuclear decay is that they create thousands of electron-hole pairs per emitted particle because of the large particle energy. However, a significant disadvantage is that the high energy of the particles damages the crystal lattice, which in turn reduces the effectiveness of the capture of more particles. Although there are ways to continuously or intermittently thermally anneal the crystal, it is unlikely that such annealing will result in a fully repaired crystal and it is a process that is difficult to utilize in devices that are in place in the field. Furthermore, because such sources depend on the use of pn-junctions, the operating temperature range of the devices is limited to about −15.degree. C. to 100.degree. C. Another approach is to generate light by the incidence of the emitted particles onto a luminescent material, and then capture the emitted light with a photocell to produce electricity. However, such an approach requires very high radioactive source levels due to the low efficiency of the incident particle-to-photon production, and the consequent absorption of the photons within the photon generating layer.

Another approach which has been considered is the use of direct charge in which charged particles, e.g., electrons, emitted from a source are collected by a collector spaced by a gap from the source, thereby building up a potential difference between the source and the collector. By increasing the gap between the source and the collector, it is theoretically possible to obtain very high voltage differences (e.g., millions of volts) due to the low capacitance between the source and the collector, but any attempt to use the power from the system to drive even a picofarad (pF) load will effectively reduce that output voltage to millivolts. Consequently, such an approach would only provide useful output voltages if the load capacitance is of the same order of magnitude as that of the source-collector capacitor. For sources having relatively low radiation flux, as generally would be the case for devices to be used in the microsensor field, the voltages that could be obtained by this approach would necessarily be quite low.

Figure 1A:
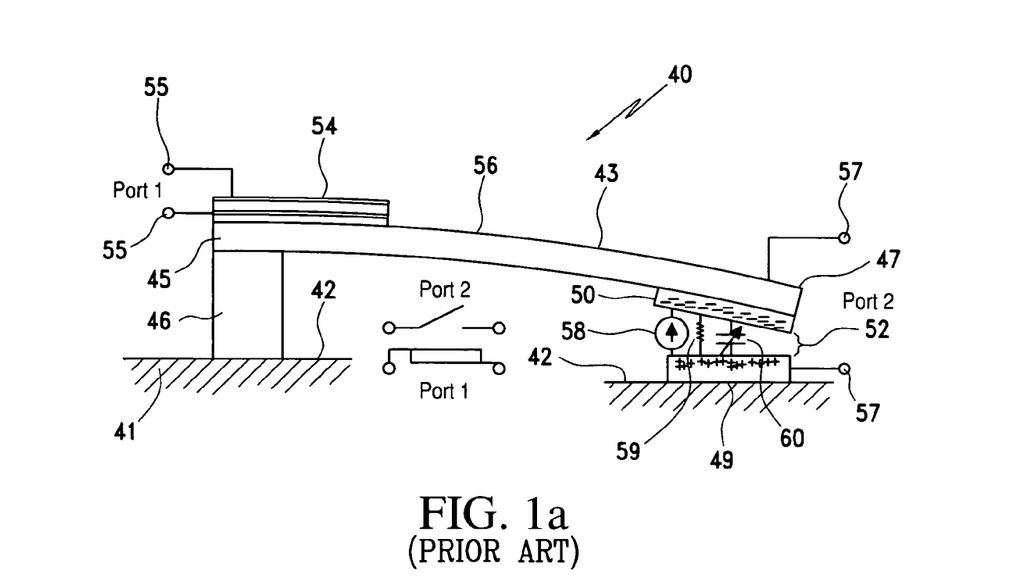
FIG. 1a, prior art, is a simplified side view of a micromechanical power generator with the equivalent circuit shown for purposes of illustration, as shown and further described in U.S. Pat. No. 6,479,920.

Referring again, by way of background, to U.S. Pat. No. 6,479,920, FIG. 1a illustrates the basic structure of the '920 patent. In this structure a cantilever beam carries a collector 50 to collect the electrons emitted by a terminal structure 57 containing a radioactive thin film. As the electrons are emitted, a voltage builds up between the collector and the terminal structure which electrostatically deforms the cantilever. Eventually the collector and terminal structure touch each other and the vibration of the cantilever leads to power generation by a piezoelectric assembly carried on the cantilever. The reciprocation time of the cantilever assembly is a function of the charging current, the leakage current, and the mechanical properties such as the spring constant of the composite cantilever and the initial gap.

While the '920 patent demonstrated certain operational principles, the efficiency of the structure is undesirably limited. There is a need, therefore, for a structure and methods for improving efficiency.

SUMMARY OF THE INVENTION

An object of the invention is to provide structures and methods to significantly improve the efficiency of the radioactive powered mechanical reciprocating beam; in a first embodiment, a betavoltaic cell is carried on the electron collector cantilever beam to provide a direct current (DC) power output that can be added to the piezo-electric circuit's alternating current (AC) power output, such that there is a continuous power output.

Another object of the invention is to provide alternative a more efficient and more nearly continuous power output from the Radioisotope Piezoelectric Generator ("RPG").

An electrical energy generator with improved efficiency has a base on which is mounted an elastically deformable micromechanical element or cantilever having a section that is free to be displaced toward the base. An absorber of radioactively emitted particles is formed on the base or the displaceable section of the deformable element and a source is formed on the other of the displaceable section or the base facing the absorber across a small gap. The radioactive source emits charged particles such as electrons, resulting in a buildup of charge on the absorber, drawing the absorber and source together and storing mechanical energy as the deformable element is bent. When the force between the absorber and the source is sufficient to bring the absorber into effective electrical contact with the source, discharge of the charge between the source and absorber allows the deformable element to spring back, releasing the mechanical energy stored in the element. An electrical generator of improved efficiency includes a first energy source comprising, in an exemplary embodiment, a piezoelectric transducer secured to the deformable element to convert the released mechanical energy to electrical energy. A second energy source comprises a betavoltaic cell carried on the deformable element or electron collector cantilever beam to provide a direct current (DC) power output that can be added to the piezo-electric circuit's alternating current (AC) power output, such that there is a continuous power output that can be used to provide power to electronic circuits.

In a second embodiment, the radioactive thin film and the collector comprise a separate capacitor that shares charge with the reciprocating piezoelectric cantilevers.

Additionally, a piezoelectric element is included at the bases of the cantilever arrays so that the main cantilevers can be excited in their parametric resonances allowing continuous small mechanical reciprocation without full contact across the capacitor.

The above and still further features and advantages of the present invention will become apparent upon consideration of the following detailed description of a specific embodiment thereof, particularly when taken in conjunction with the accompanying drawings, wherein like reference numerals in the various figures are utilized to designate like components.

DETAILED DESCRIPTION OF THE PREFERRED EMBODIMENT

Referring again to U.S. Pat. No. 6,479,920 FIG. 1a, for nomenclature, a collector 50 collects the electrons emitted by the structure 57 containing the radioactive thin film. As the electrons are emitted, a voltage builds up between collector 50 and 57 which electrostatically deforms the top cantilever. Eventually the plates touch each other and the vibration of the cantilever leads to power generation by the piezoelectric assembly 54-55. The reciprocation time of the cantilever assembly is a function of the charging current, the leakage current, and the mechanical properties such as the spring constant of the composite cantilever and the initial gap. The energy carried by particles emitted by radioactive decay in a radioisotope is captured and converted to mechanical potential energy that is stored in the elastically deformable element or cantilever 43. The release of the energy stored in the deformable element can be utilized to activate other mechanical parts directly or can be converted to electrical energy that can be supplied to drive electronic components such as an integrated circuit. The conversion of the energy from the radioactive emissions directly to mechanical potential energy, then to electrical energy, can be carried out utilizing structures and materials which are not significantly affected over time by the radioactive emissions, in contrast to conventional pn-junction semiconductor devices which directly convert the energy of the radioactive emissions to electrical energy.

For purposes of illustration and nomenclature, a micromechanical activation device for electrical power generation is illustrated generally at 40 in FIG. 1a (and FIG. 1 of the '920 patent). The device 40 includes a base or substrate 41 (which may be made of common materials used in micromechanical systems such as single crystal silicon, glass, etc.), having a top surface 42 on which is mounted an elastically deformable element 43 which, for the device 40, comprises an elongated cantilever beam having a fixed or proximal end 45 which is mounted to the base 41 by a mounting block 46, and a free or distal end 47. A radioactive source 49 is mounted to the base under the free end 47, and an absorber 50 of radioactively emitted particles is mounted to the element 43 at its free end 47 facing the base 41 and the radioisotope source 49. Although the absorber 50 is shown mounted on the element 43 and the source 49 is shown on the base for purpose of illustrating the invention, it is understood that the absorber 50 may be on the base and the source 49 may be on the deformable element. The mounting block 46 suspends, the cantilever bridge element 43 over the top surface 42 of the base 41 and normally holds the bottom face of the absorber 50 spaced from the upper face of the radioactive source 49 by a gap 52. A piezoelectric element 54, having output terminals 55, is secured to the top surface 56 of the cantilever element 43 so that the piezoelectric plate 54 will flex and deform with the deformable cantilever 43. The radioisotope source 49 is preferably formed of a material that emits charged particles, preferably primarily electrons. The particles emitted by radioactive decay from the source 49 that impinge upon the absorber 50 are absorbed and retained by the material of absorber 50, charging absorber 50 negatively (where electrons are emitted by the source), whereas the source 49 retains a positive charge. The absorber 50 is preferably formed of a good conducting metal that will readily absorb the electrons impinging upon it, and it is preferably electrically insulated from the cantilever beam 43 or otherwise is electrically insulated so that a current cannot flow through the beam 43, the support 46, and the base 41 between the source 49 and the absorber 50. As charge builds up on the absorber 50 and the source 49, the electrostatic force between these elements increases, and bending the cantilever beam 43 so that the absorber 50 begins to approach the source 49, reducing the gap 52 between the source and the absorber. The force applied to the beam 43 to bend it downwardly stores mechanical potential energy in the beam 43. If the initial gap 52 is selected appropriately, after a specific length of time, the beam 43 will bend sufficiently that the absorber 50 makes an effective electrical contact with the source 49, thereby discharging the charge on these elements and releasing the beam 43, which resiliently returns toward its rest or normal position as it releases the potential energy stored in the bent beam, and in doing so releases the stress imposed on the piezoelectric plate 54 which generates a pulse of electrical power at the output terminals 55 of the piezoelectric element 54. As used herein, effective electrical contact includes not only physical contact, but sufficient proximity such that a current flows between the absorber and source to discharge the charge built up on these elements.

As illustrated in FIG. 1a, an electrical model of the radioisotope source 49 and the absorber 50 as a circuit element between terminals 57 can be represented equivalently as a current source 58, a resistor 59, and a nonlinear capacitor 60. The current source 58 constitutes the emitted charges, the resistor 59 is due to ionization current of gas in the gap 52, and the nonlinear capacitor 60 corresponds to the capacitance between the source 49 and the absorber 50. The capacitance of the capacitor 60 changes as the beam 43 is bent and the absorber 50 approaches the source 49. The radioisotope source is modeled as a current source 58 as well as one of the electrodes of the capacitor 60 formed between the source and the cantilever. Since the cantilever keeps moving closer to the source, the capacitance varies with time. The resistance 59 is included to model the possible leakage path.

The basic radioisotope powered piezoelectric generator shown in FIG. 1a works as follows:

The radiated kinetic energy $E_r$, for one reciprocation cycle is $$E_r = I_r E_{avg}(T_{rec} + T_{vib}) \cong I_r E_{avg} T_{rec}, \quad (1)$$

where $I_r$ is the net current due to the collection of emitted charged particles, $E_{avg}$ is the average kinetic energy of the emitted particles, $T_{rec}$ is the reciprocation period, and $T_{vib}$ is the duration for which the vibrations are sustained. The vibration period $T_{vib}$, is usually negligible compared to $T_{rec}$ for the devices with high efficiency, as high charge voltages requiring long reciprocation times lead to high efficiency. The reciprocation period $T_{rec}$, can be calculated using $$T_{rec} = \frac{Q_{final}}{I_r} = \frac{\sqrt{2\varepsilon A k \delta_0}}{I_r}, \quad (2)$$

by modeling the air-gap capacitor as a current controlled electrostatic actuator. The electromechanical energy $E_{em}$ stored in the cantilever just before discharge is $$E_{em} = E_m + E_q = \frac{1}{2}k\delta_0^2 + \frac{Q_p^2}{2C_p} \cong \frac{1}{2}k\delta_0^2, \quad (3)$$

where $E_m$ is the stored mechanical energy, $E_q$ is the stored dielectric energy in the piezoelectric element, k is the stiffness of the cantilever beam, $\delta_0$ is the initial gap height, $Q_p$ is the charge induced in the piezoelectric just before contact due to the bending deformation and $C_p$ is the capacitance of the piezoelectric element. For the devices discussed here, $E_m \sim 1000 E_q$.

After discharge, the cantilever starts vibrating, straining the piezo element at the base. This produces charges in the piezo element, which can be collected across a resistor load as shown in FIG. 1a. For a given level of vibration, A, of the cantilever, the voltage across the load resistor R1 can be written as $$P_{out} = \frac{\omega^2 w^2 h_{np}^2 e_{31}^2 \overline{A}^2}{\left(1 + wL_p \varepsilon_{33} \frac{\omega R_l}{h_p}\right)} R_l$$

where $\omega$ is the angular frequency at resonance, w is the width of the piezoelectric element, $h_{np}$ is the distance between the neutral plane and the piezo mid plane, $e_{31}$ is the piezoelectric coupling coefficient, $\overline{A}$ is the geometrical parameter relating tip deflection to the strain developed, $L_p$ and $t_p$ the length and thickness of the piezo element. $\overline{A}$ can be calculated easily from cantilever beam theory.

The extracted electrical energy per cycle $E_{ext}$, across a load resistor $R_1$, is given by $$E_{ext} = \int_0^{T_{vib}} \frac{V_{out}^2(t)}{R_l} dt, \quad (4)$$

where $V_{out}(t)$ is the output voltage. The ratio of the extracted electrical energy to radiated kinetic energy $\eta$ is $$\eta = \eta_r \eta_{me} = \frac{E_{em}}{E_r} \frac{E_{ext}}{E_{em}} = \frac{E_{ext}}{E_r}, \quad (5)$$

where $\eta_r$ is the ratio of the stored electromechanical energy to radiated kinetic energy and $\eta_{me}$ is the ratio of the extracted electrical energy to stored electromechanical energy. The ratio $\eta_r$ can be maximized by designing the peak charging voltage of the air-gap capacitor, $V_{capmax}$, to satisfy the following condition.

$$V_{capmax} = \sqrt{\frac{8}{27} \frac{k \delta_0^3}{\varepsilon A}} = \frac{E_{avg}}{q}. \quad (6)$$

The above equation is based on the simplifying assumption that the peak charging voltage is not limited by voltage breakdown in the gap and all the emitted particles have a kinetic energy of $E_{avg}$. Writing $\delta_o$ in terms of $V_{capmax}$ and substituting the expression for $T_{rec}$ in the expression for $\eta_r$ we get $$\eta_{rmax} = \frac{1}{2}\sqrt{\frac{27}{16}} = 0.64. \quad (7)$$

Modeling the resonant system as a single degree of freedom system [13], it can be shown that $\eta_{me}$ can be maximized to $$\eta_{me} = \frac{k_{me}}{k_{me} + 2C_p c 2\pi f}, \quad (8)$$

by using an optimum value of $R_1$ given by $$R_{opt} = \frac{1}{C_p 2\pi f}. \quad (9)$$

Here, $k_{me}$ is the mechanical to electrical coupling coefficient dependant on the geometry of the cantilever beam system and the characteristics of the piezoelectric element, $C_p$ is the dielectric capacitance of the piezoelectric element, c is the mechanical damping coefficient and f is the resonance frequency of the cantilever beam system given by $$f = \frac{\lambda_i^2}{2\pi}\sqrt{\frac{k}{(0.23m + m_s)}},\qquad(10)$$

where $\lambda_i=1.875$ for fundamental bending mode, m is the mass of the cantilever beam, $m_s$ is the mass of the collector plate. The collector plate mass provides an additional degree of freedom in adjusting the resonant frequency without changing the stiffness of the beam (for keeping $T_{rec}$ constant). From Equation 8, $\eta_{me}$ approaches unity in the absence of mechanical damping, or, $\eta_{me\ max}=\eta_{me}|_{c\to 0}=1$.

Therefore, the maximum possible conversion efficiency for the device is $$f_{max}\times 100=\eta_{r\ max}\lambda_{me\ max}\times 100=64\%.\qquad(11)$$

Figure 1B:
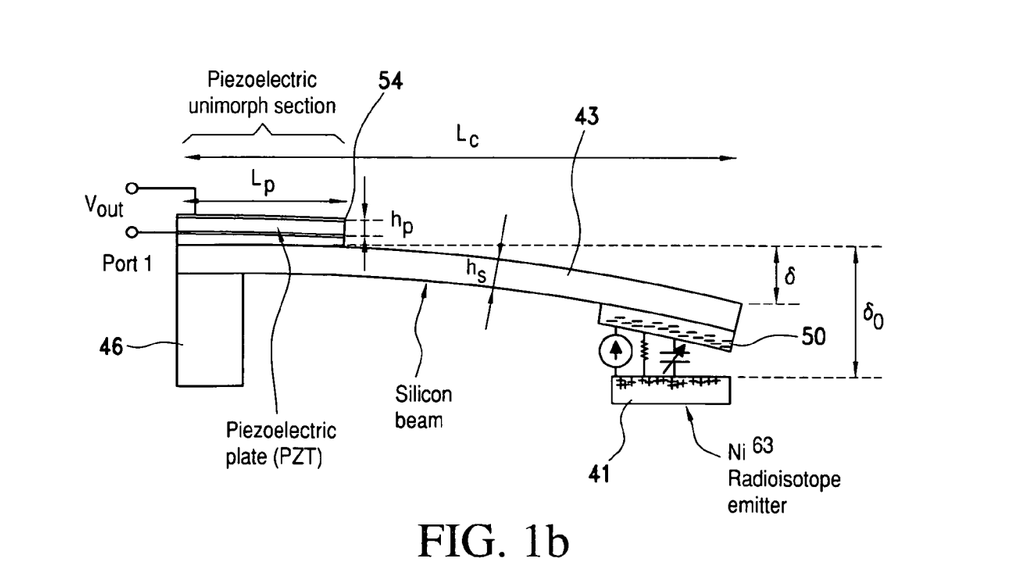
FIG. 1b is a diagram illustrating, in a cross-section, the geometrical parameters of the structure and a model of the air-gap capacitor; the current source represents a source of emitted charges and symbolic resistance, R, is due to ionization current/secondary electron emission; the source plate and the collector plate form a capacitor, in accordance with the present invention.
Figure 2A:
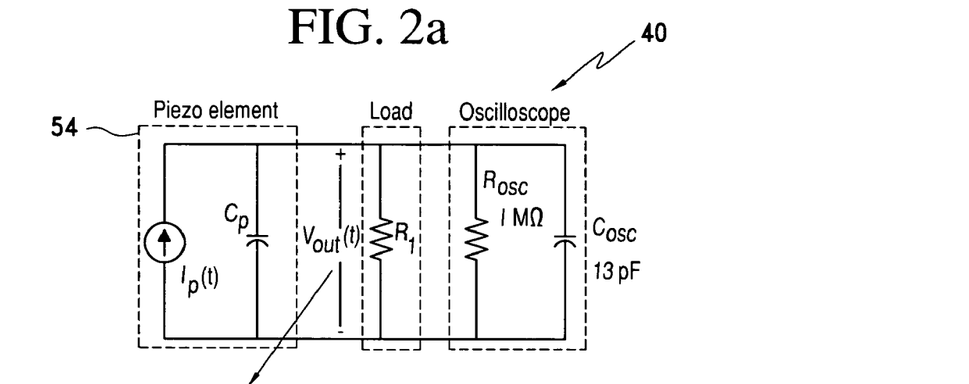
FIG. 2a is a schematic diagram illustrating the operating principles of the micropower generator of the present invention.
Figure 2B:
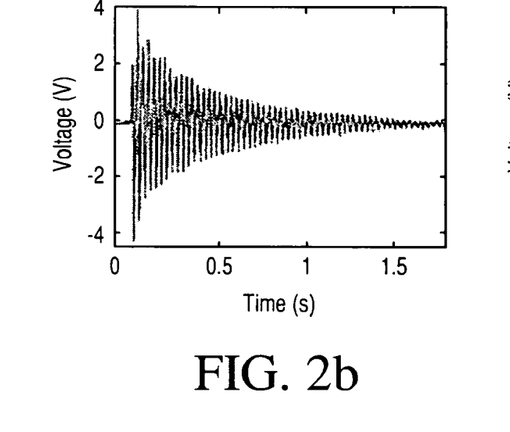
FIG. 2b is a graphical representation of a sample output (voltage as a function of time) for the micropower generator of FIG. 2a, in accordance with the present invention.
Figure 2C:
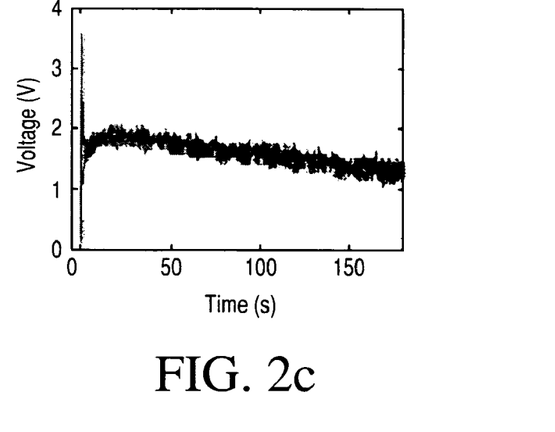
FIG. 2c is a graphical representation of the Radioisotope Piezoelectric Generator ("RPG") output rectified by a bridge rectifier and used to charge a capacitor (voltage as a function of time) for the micropower generator of FIG. 2a, in accordance with the present invention.

Although the configuration of the structure described in the '920 patent works, there are several factors that limit its efficiency. First, during the charging process, the absorber or collecting plate 50 (FIG. 1) is charged to a high voltage. In the original design, the efficiency of the converter is directly related to the high voltage obtained as the high energy electrons have to traverse the high voltage gap 52. However, as the emitted kinetic energy of the electrons is in 10-20 keV range, and the maximum voltage one can generate is on the order of 5-10 kV, much of the kinetic energy of the emitted electrons is often lost as heat. In order to productively use much more of this kinetic energy, a betavoltaic cell 100 is attached on the collector side of deformable beam 43, as shown in FIG. 3.

Figure 3:
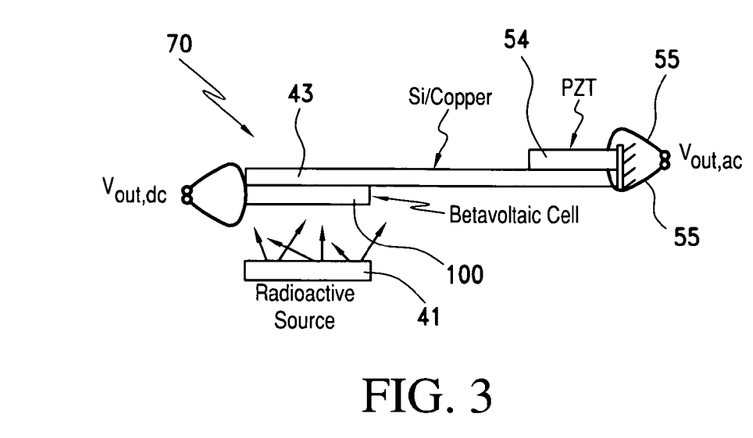
FIG. 3 is a side view diagram schematically illustrating the features of a Betavoltiac-Radioisotope Piezoelectric Generator hybrid micropower generator of the present invention.

FIG. 3 is a side view diagram schematically illustrating the features of a Betavoltiac-Radioisotope Piezoelectric Generator (RPG) hybrid micropower generator 70. Betavoltaic cell 100 is essentially a semiconductor pn-junction (see FIG. 6). When an electron hits the junction surface, many electron-hole pairs are generated which are swept across a built-in depletion region of cell 100 leading to voltage and current availability. Betavoltaic cells have been investigated for decades as mechanisms for conversion of beta-energy particles into electrical power. By integrating betavoltaic cell 100 with the charge collection, two forms of energy conversion are integrated to develop a power source in which the efficiency of each method can is added. For example, a SiC betavoltaic can be 7-8% efficient in power conversion, while the charge-to-piezo converter can be 5 to 25% efficient depending the mode is used. In this case the total power efficiency can be from 13 to 33%.

Figure 4:
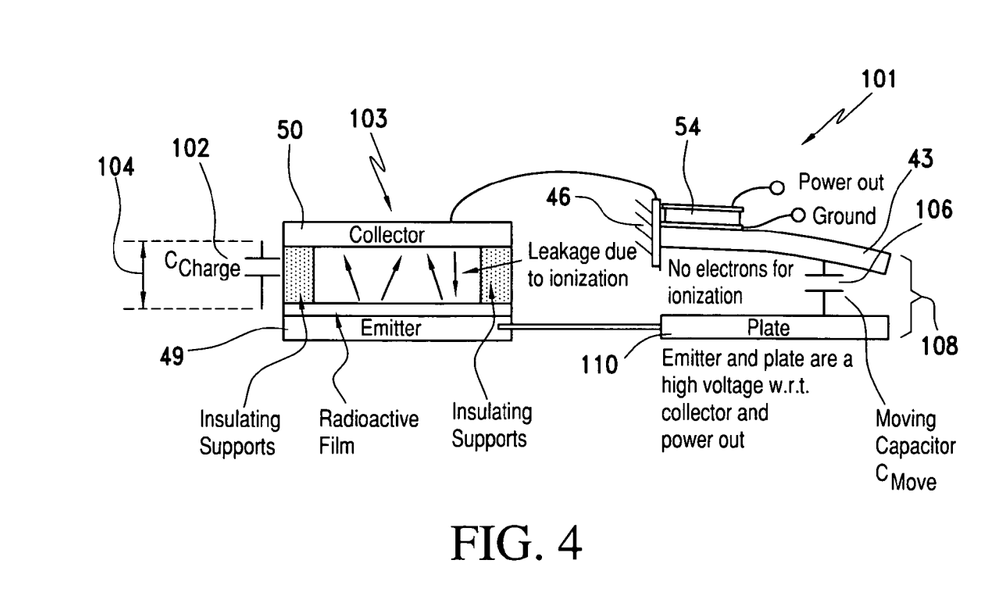
FIG. 4 is a side view diagram schematically illustrating the features of a separate collector Radioisotope Piezoelectric Generator with a separate collector, in accordance with the present invention.

FIG. 4 is a side view diagram schematically illustrating the features of a separate collector Radioisotope Piezoelectric Generator (RPG) 101 with a separate collector 103, in accordance with the present invention.

A second limiting factor in the configuration of FIG. 1a is that the electrons are emitted into the same location as the moving plates. As the voltage increases, and the plates 49, 50 come closer, the effective electric field between the plates increases rapidly. Because the emitted electrons are present also, which increase the rate of ionization of the gas molecules in gap 52, and the increased e-field can lead to high leakage currents, as modeled by the resistor 59. In order to reduce this leakage current, the collector and the cantilever functions are separated in space. This embodiment is illustrated in FIG. 4, in which a separate capacitor $C_{Charge}$ 102 is formed with a gap 104 that is basically rigid or substantially fixed. The charge collected is shared between $C_{Charge}$ 104 and $C_{Move}$ 106 which is formed in the movable gap 108 between the cantilever 43 and plate 110, but there are no emitted electrons to increase ionization current in the moving capacitor 106. By keeping the gap 104 constant and large enough, the electric field is kept small and the ionization current can be minimized. In a preliminary experiment the reciprocation time was reduced by a factor of three simply by placing the charging capacitor $C_{Charge}$ 102 separately. This method allows more efficient operation by reducing the ionization current (due to $C_{Charge}$) generated during the charging process.

Figure 5:
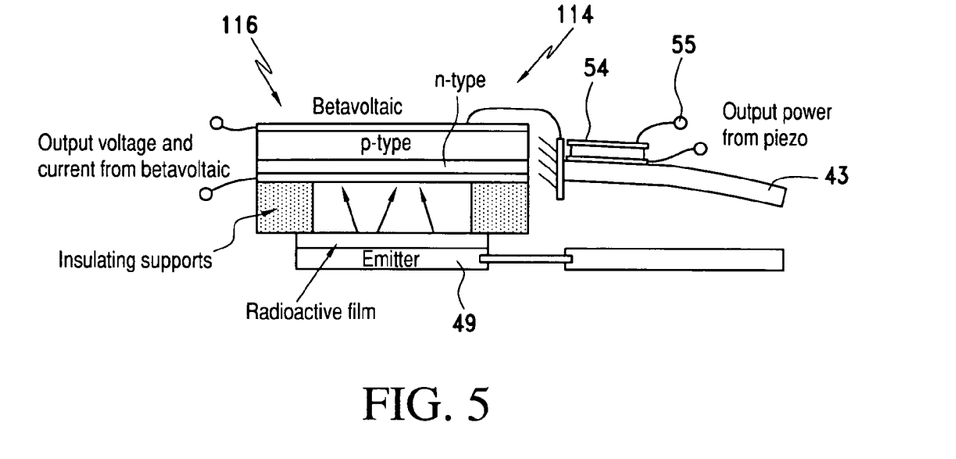
FIG. 5 is a side view diagram schematically illustrating the features of a Radioisotope Piezoelectric Generator with a separate betavoltaic collector, in accordance with the present invention.

FIG. 5 shows another embodiment, a side view diagram schematically illustrating the features of a Radioisotope Piezoelectric Generator 114 with a separate betavoltaic collector 116, in accordance with the present invention. Insulating supports provide a fixed spacing or gap separating radioactive source or emitter 49 from betavoltaic cell 116.

Figure 6:
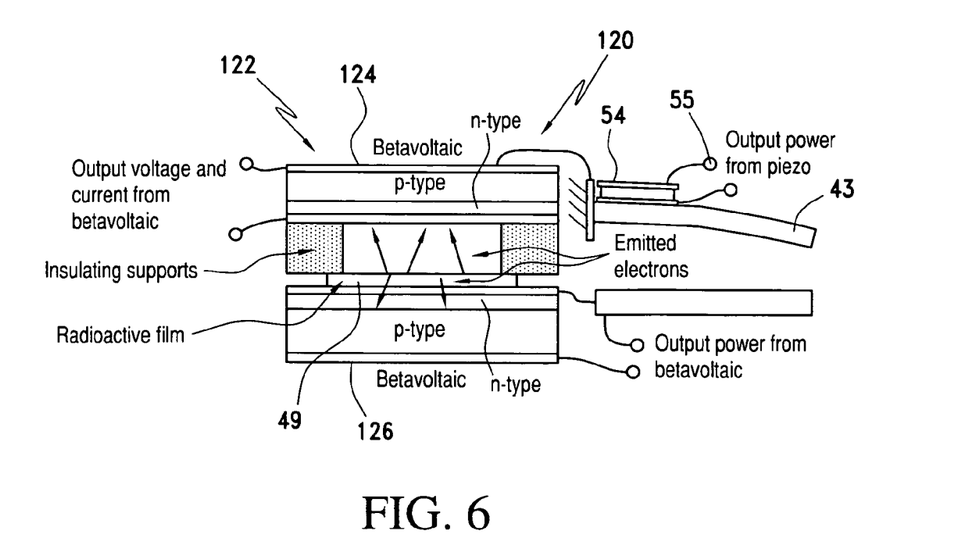
FIG. 6 is a side view diagram schematically illustrating the features of a RPG with separate collector comprised of 2 betavoltaic cells on either side of the radioisotope source, in accordance with the present invention.

A third limiting factor in the configuration of FIG. 1a is that in the normal radioactive thin film, approximately one half (½) of the electrons going towards the substrate onto which the thin film is deposited are lost. By placing a betavoltaic cell underneath the thin film, we can extract power from the electrons emitted from the backside. This is shown in FIG. 6, a side view diagram schematically illustrating the features of a RPG 120 with separate collector 122 and first and second betavoltaic cells 124, 126 on opposing sides of the radioisotope source 49, in accordance with the present invention. Insulating supports provide a fixed spacing or gap separating radioactive source or emitter 49 from first betavoltaic cell 124.

Figure 7:
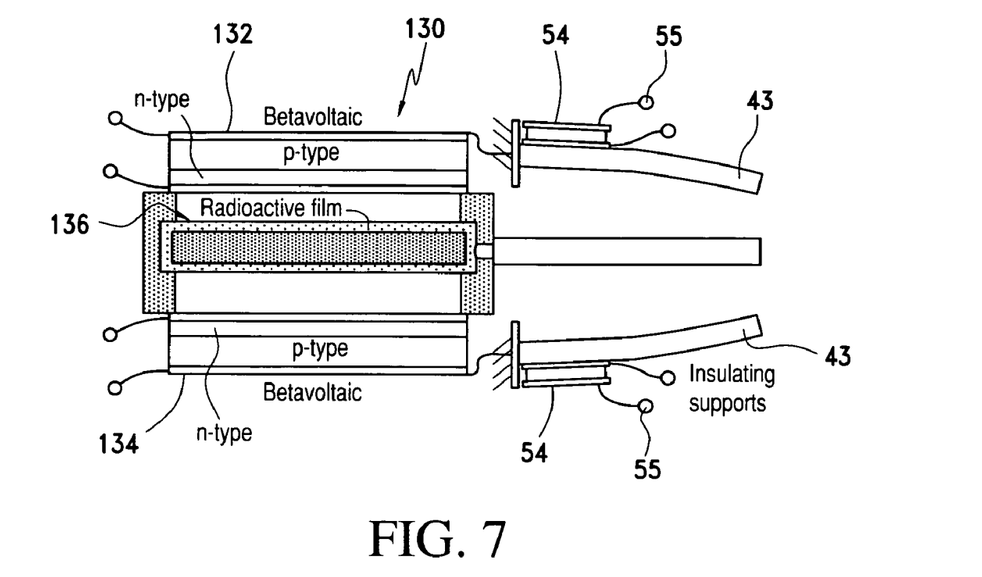
FIG. 7 is a schematic illustration of a RPG employing two betavoltaic collectors on either side of a radioisotope source plated on metallic substrates, in accordance with the present invention.

FIG. 7 is a schematic illustration of a RPG 130 employing first and second betavoltaic collectors 132, 134 on either side of a radioisotope source 136 plated on metallic substrates, in accordance with the present invention. In many cases the radioactive thin films are electroplated over metallic thin substrates rather than betavolatic cells. In most cases the radioactive thin films can be deposited on both sides of the substrate. In this case the architecture of FIG. 7 enables extraction of the maximum power.

Figure 8:
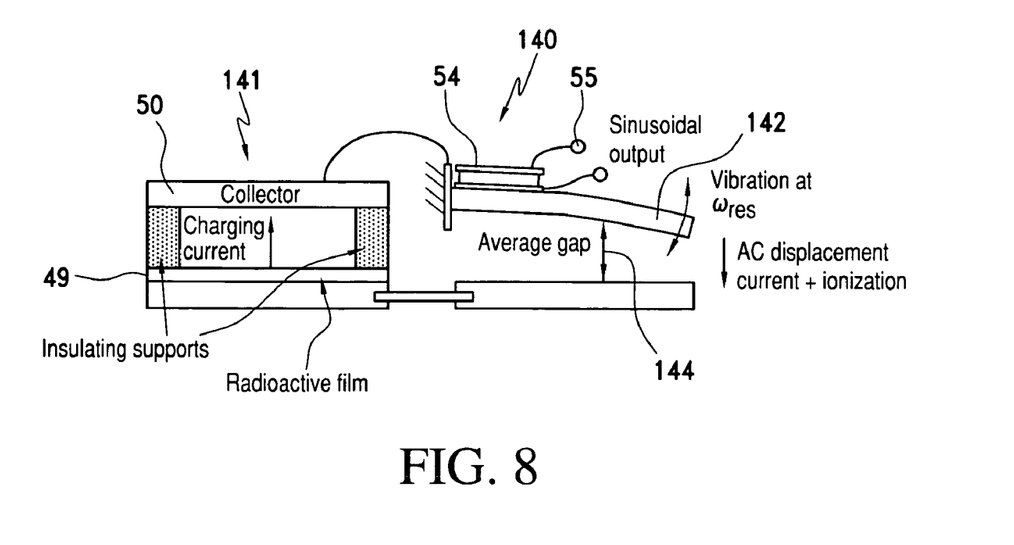
FIG. 8 is a schematic illustration of a continuously vibrating RPG employing a separate collector, in accordance with the present invention.

In another embodiment, an operating principal referred to as "partial reciprocation" is utilized. In the '920 patent and embodiments described above, the term "reciprocating cantilever" meant the reciprocation of a cantilever (e.g., 43) all the way across the gap (e.g., 52) between the collector 50 and the emitter 49. FIG. 8 is a schematic illustration of a continuously vibrating RPG 140 employing a separate collector 141. In the embodiment of FIG. 8, self-excitation of cantilever 142 at a frequency near resonance enables it to vibrate continuously. The distance cantilever 142 moves will be a small fraction of the gap distance 144. This region of operation has a tremendous advantage that the voltage across the emitter 49 and collector 50 is maintained at a high voltage, maintaining the device 140 always in a high efficiency operation. In contrast, the quasi-static full-gap reciprocation of the prior art design leads to a shorting of the emitter-collector couple requiring a starting of the charging from a zero potential level. In the continuous-partial-reciprocation, the emitter-collector capacitor loses charge via the displacement current which is nonlinear across one vibration cycle. The net current times the average voltage during the vibration cycle is the amount of power lost by the continuous reciprocation process. Another source of energy loss is the energy generated across the piezoelectric element 54, which is also being strained at the resonance frequency. During this same cycle, the amount of energy input into the system is the emitted current times the average voltage. Hence, a critical emitted current or radioactive activity is needed to sustain the oscillations.

Figure 9:
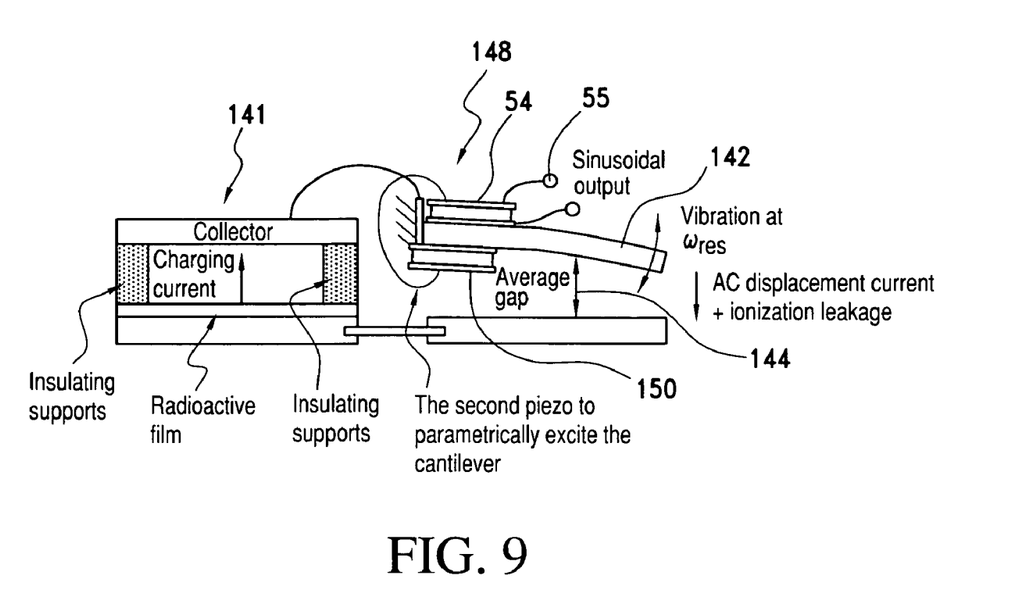
FIG. 9 is a schematic illustration of a continuously vibrating RPG employing a separate collector and a piezoelectric actuator for biasing the cantilever at the point of maximum efficiency, in accordance with the present invention.

FIG. 9 is a schematic illustration of a continuously vibrating RPG 148 employing a separate collector 141 and a second piezoelectric actuator 150 for biasing the cantilever 142 at the point of maximum efficiency. The excitement of self-sustained oscillation is critical. By the dynamical equations of the electromechanical system, an instability leading to a self-sustained oscillation is predicted. However, one can guarantee the excitement using base vibrations of the cantilever system, as shown in the illustrative embodiment of FIG. 9.

Figure 10:
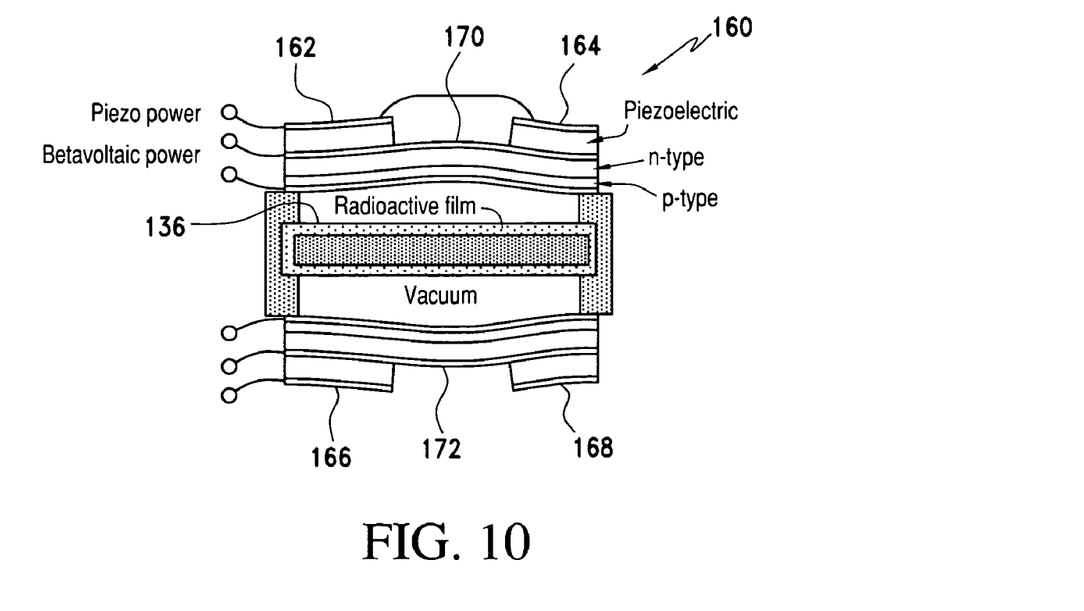
FIG. 10 is a schematic illustration of a continuously vibrating RPG with the piezoelectric unimorphs integrated with the betavoltaic collectors for maximum efficiency, in accordance with the present invention.
Figure 11A:
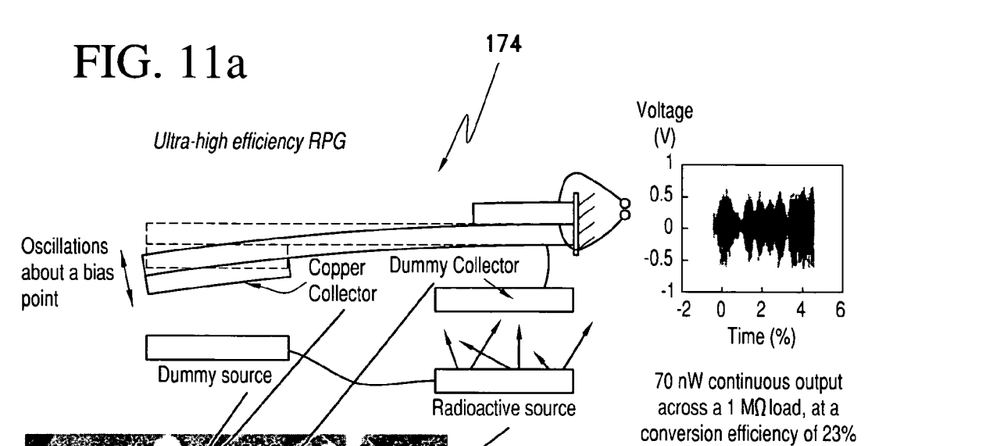
FIG. 11a is a schematic illustration of the continuous vibration of the RPG about a bias point to give high efficiency conversion, and measured output of the continuous vibration, in accordance with the present invention.
Figure 11B:
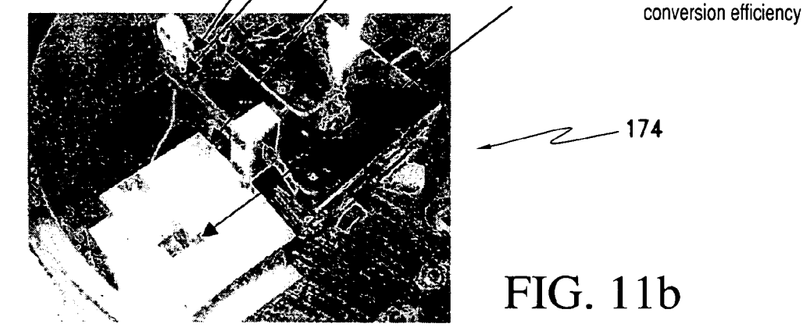
FIG. 11b is a photograph of the experimental set-up for the ultra-high efficiency RPG of FIG. 11a, in accordance with the present invention.

The use of partial-continuous reciprocation can be further integrated with the betavoltaics to add to the power conversion efficiency in several ways. However, one embodiment in FIG. 10, a schematic illustration of a continuously vibrating RPG 160 with first, second, third and fourth piezoelectric unimorphs 162, 164, 166, 168 integrated with first and second opposing betavoltaic collectors 170, 172 for maximum efficiency, in accordance with the present invention. The tremendous advantage here is that no electrical connection to the radioactive thin film 136 is needed, and the vacuum is limited to around the radioactive thin films. This task can be done easily by wafer bonding techniques. FIG. 11a is a schematic illustration of a continuous vibration RPG 174 about a bias point to give high efficiency conversion, and measured output of the continuous vibration, in accordance with the present invention. FIG. 11b is a photograph of the experimental set-up for the ultra-high efficiency RPG 174, in accordance with the present invention.

So far the applicants have described exemplary embodiments of structural modifications to the basic structure described in the '920 patent to obtain higher efficiency from within the device itself. In principal the power output of the array will scale with the emitter area. This can be done by increasing the size of one device by having one cantilever that covers the entire emitter area. Another alternative is to enable arrays of several micro-fabricated small generators occupying some fraction of the total emitter area. As demonstrated by microfabricating the power generators, it is also possible to array many such generators in parallel on one silicon die chip or across an entire wafer. The microfabricated smaller power generators are usually more efficient than the macro scale power generators due to less damping and better control mechanical interfaces between dissimilar materials by thin film processing. Experimentally the applicants have measured better device performance characteristics than the bulk counterparts. Microfabricated devices with 1 cm long cantilevers were tested to yield 4% efficiency, compared to similarly sized macro scale cantilevers whose efficiency peaked at 2.7%.

Each element in an array of RPGs will be firing at different times and therefore a major challenge is on how to add up the power the RPGs generate. One could, in principle, develop a way so all the cantilevers are phase-locked and fire at once. This technique would require some mechanical or electrical coupling that causes the cantilevers to fire all at once. Hence, in this embodiment, mechanical linkages in the form of microfabricated springs can be formed between the different RPGs.

In another embodiment, a rectifier followed by a storage capacitor can be used to store the charge generated. The stored charge can then be added by using a series of charge pumps. However, the charge pumping process may consume much power, reducing the overall efficiency of the power generation.

Figure 12:
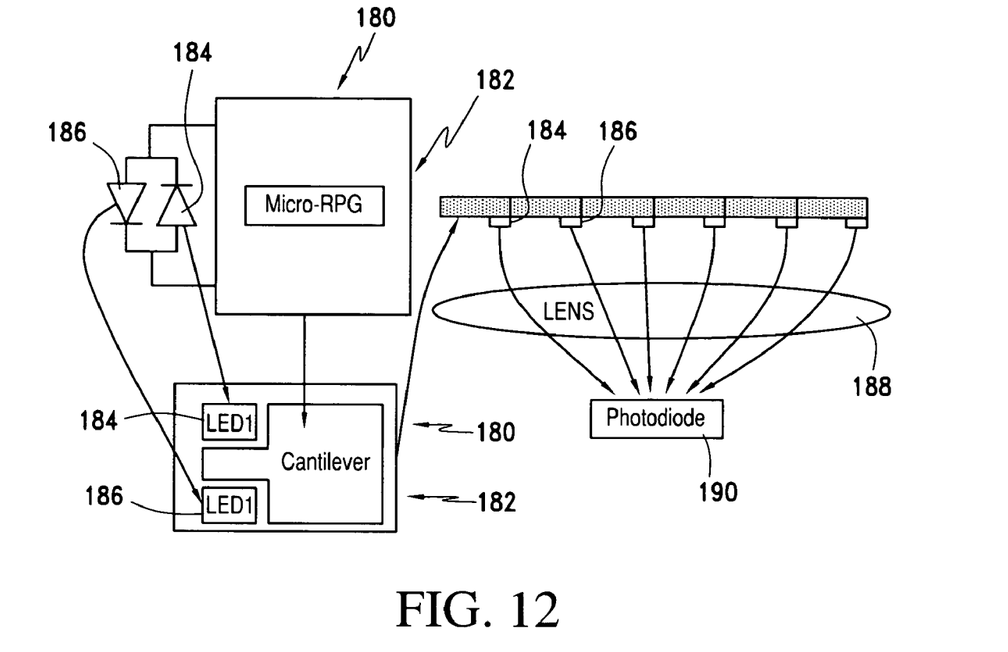
FIG. 12 is a schematic illustration of an array of micro cantilevers employing optical addition of power outputs; top left shows first and second LEDs back-to-back such that an AC signal imposed upon them from the RPG energizes one or the other LED to generate light as the polarity of the voltage changes across each diode, and the right side of the diagram illustrates that light from each RPG can be integrated using a light converging lens, in accordance with the present invention.

In another embodiment, the output from two or more RPGs (e.g., 180, 182) can be connected each to its own highly efficient LED (Light Emitting Diode) (e.g., 184, 186) as illustrated in FIG. 12, is a schematic of an array of micro cantilevers employing optical addition of power outputs; top left shows first and second LEDs 184, 186 back-to-back such that an AC signal imposed upon them from the RPG energizes one or the other LED to generate light as the polarity of the voltage changes across each diode, and the right side of the diagram of FIG. 12 illustrates that light from each RPG can be integrated using a light converging optical waveguide or lens 188. As the RPG fires and generates power, the LED generates light which is monodirectional. Since the light is generated without any phase information, light from several LEDs can be added using an optical lens. As the different cantilevers fire at different times, their light is added together via the lens. The light from the lens can then be focused onto a photodiode solar-cell 190 where the light is turned back into electricity. The efficiency of wavelength tuned photodiodes can be near 90%, and the conversion efficiency of the LED for electrons to photon generation can also be 80-90%. So the total loss in conversion from an array where the power is added up in this way is approximately 20%. Instead of using a bulk lens which may consume volume and contribute weight, one could use a light guiding Fresnel lens and on-chip optical waveguides, and the device can be made into a planar power source.

Another physical effect that is a consequence of the RPG operation is an arc generation that occurs at the point of the cantilever shorting with the emitter surface. This arc energy is radiated in all directions and is an energy loss mechanism of the system.

Figure 13:
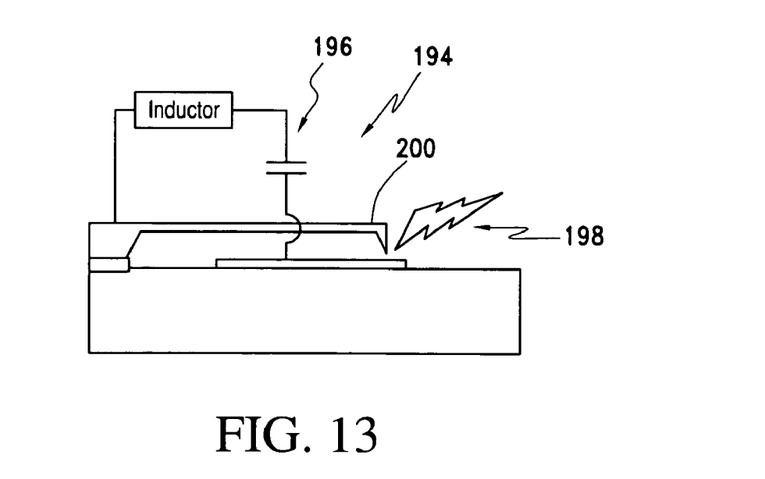
FIG. 13 is a schematic illustration of a spark-gap discharge generator, in accordance with the present invention.

To the extent we can capture this energy, the efficiency of the RPG can be further improved. In this section methods to collect and shape the emitted RF energy are described. FIG. 13 is a schematic illustration of a spark-gap discharge generator 194, in accordance with the present invention. Much like the early RF communication systems that utilized arcs in spark gaps to generate RF pulses [Syntony and Sparks-The origins of Radio, Aitke, Wiley], the RPG generates a spark arc as the cantilever (e.g., 43) comes very close to the emitting surface 49, as the charge buildup across the capacitor can reach hundreds to thousands of volts which can electrically breakdown the gap 52 between the source and emitter. The breakdown depends on the voltage and the pressure of the gas between the electrodes and is governed by the well known Paschen curve, modified by the presence of the emitted electrons which can only reduce the voltage required to arcing as they can create ions that initially are the cause of an arc buildup. In old spark-based RF systems, the arc electromagnetic energy was coupled into a resonant RF cavity or circuit formed by a combination of inductors and capacitors, distributed or lumped. The arc represents an impulse excitation that can excite the resonant modes of the cavity. In the RPG 194 of FIG. 13, the spark is generated and can be coupled into various structures.

Figure 14A:
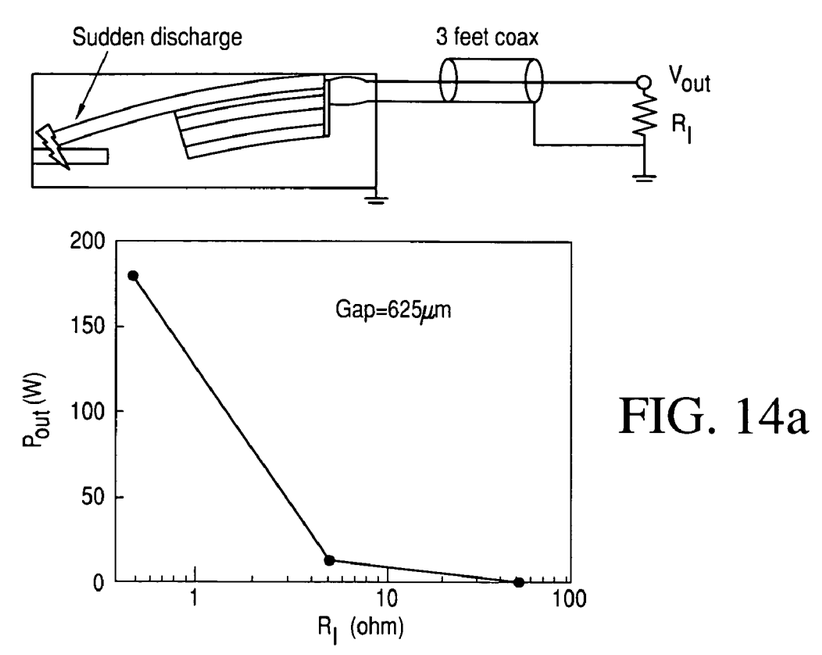
FIG. 14a is a graph illustrating measured power output vs. wired load impedance across a dielectric stack on the radioisotope powered cantilever, in accordance with the present invention.
Figure 14B:
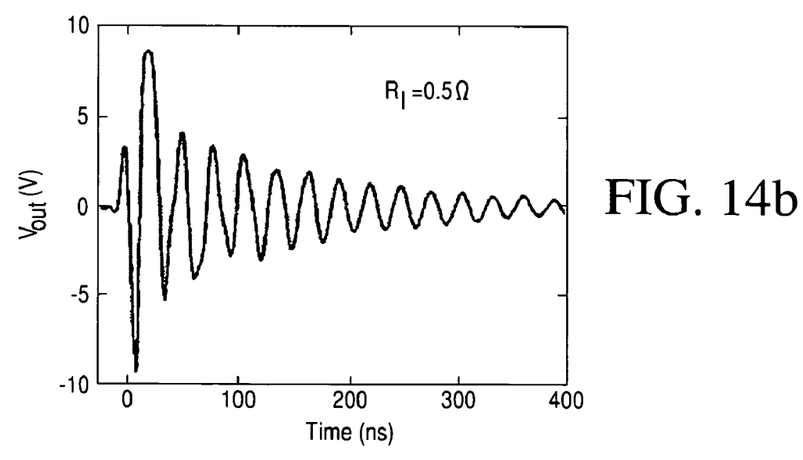
FIG. 14b is a graph illustrating measured voltage output across 0.5Ω load, for a 5 mm long PZT RPG, in accordance with the present invention.

In the first embodiment, a high-dielectric constant capacitor 196 is fabricated or assembled near the spark gap 198. The spark induces an RF pulse into capacitor 196. A RF pulse that corresponds to the ½ wavelength resonant mode of the beam 200 is emitted as described below:

FIG. 14a is a graph illustrating measured power output vs. wired load impedance across a dielectric stack on the radioisotope powered cantilever, and FIG. 14b is a graph illustrating measured voltage output across 0.5ωload, for a 5 mm long PZT RPG, in accordance with the present invention.

In another embodiment, the load is a very small circular loop into which large amount of current is injected as the cantilever shorts across the emitter. In this case a loop antenna is realized and a large amount of Rf energy radiated via this antenna.

Figure 15A:
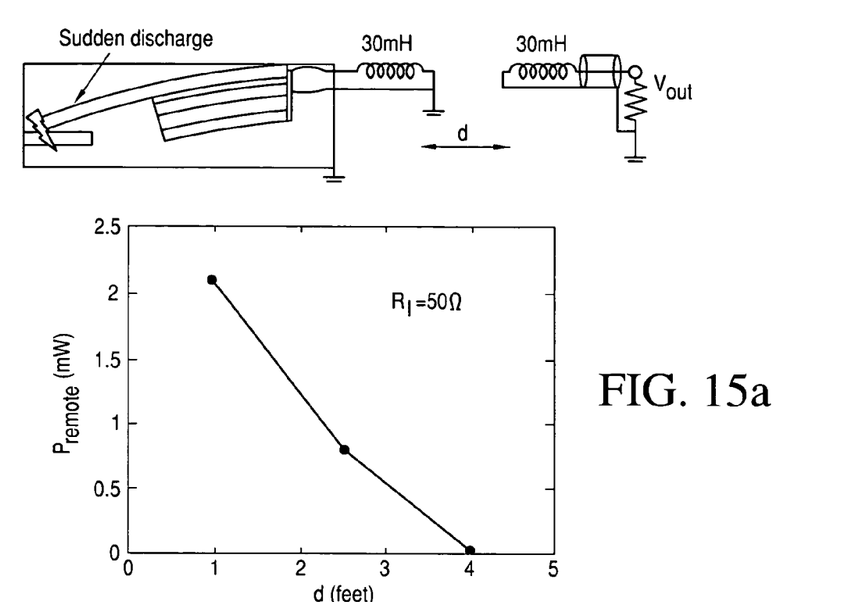
FIG. 15a is a graph illustrating measured wireless signal power vs. detection distance, for an inductor connected across a dielectric stack on the radioisotope powered cantilever, in accordance with the present invention.
Figure 15B:
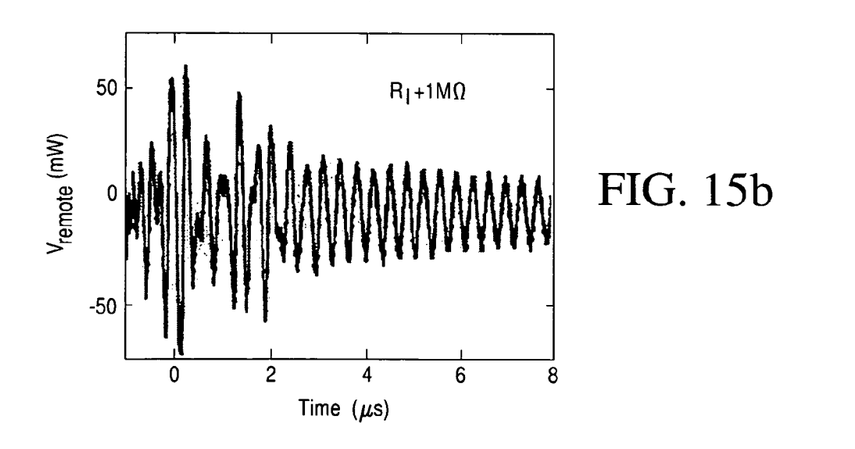
FIG. 15b is a graph illustrating measured remote signal at d=6feet for R1=1MΩ, for a 5 mm long PZT RPG, in accordance with the present invention.

FIG. 15a is a graph illustrating measured wireless signal power vs. detection distance, for an inductor connected across a dielectric stack on the radioisotope powered cantilever, and FIG. 15b is a graph illustrating measured remote signal at d=6 feet for R1=1Mω, for a 5 mm long PZT RPG, in accordance with the present invention.

Using the above embodiments it is possible to radiate milliwatts to hundreds of watts of power from the RPG enabling applications such as self-powered beacons. These devices may be placed in structures which need to be located if lost, for example household keys which are often misplaced. A small microscale beacon could be read out by receivers which can locate where a key may be misplaced. Beacons can be also be placed inside sensors that are embedded into walls, and can transmit for the lifetime of the radioisotope used, which can be hundreds of years.

By placing modulators in the antenna structure, information about the sensor can be transmitted from each pulse. For example, if one wanted to measure humidity in a wall to measure the penetration of water in a structural foundation, a humidity sensitive capacitor can be placed in parallel with the transmitting antenna cavity, thereby affecting its resonant frequency. The change in resonance frequency could be measured at some distance inside the basement enabling log lifetime monitoring of structural walls.

Having described preferred embodiments of a new and improved methods and apparatus, it is believed that other modifications, variations and changes will be suggested to those skilled in the art in view of the teachings set forth herein. It is therefore to be understood that all such variations, modifications and changes are believed to fall within the scope of the present invention, as set forth in the appended claims.

What is claimed is:

1. A power generator comprising:
   (a) a base;
   (b) an elastically deformable element having a section spaced from the base that is free to be displaced toward the base from an initial position by elastic deformation of the deformable element;
   (c) a first electrical generator coupled to the deformable element for developing an electrical potential across output terminals of the generator as the deformable element returns elastically to its initial position;
   (d) an absorber of radioactively emitted particles formed on one of the displaceable section of the deformable element and the base;
   (e) a material comprising a radioactive source formed on the other of the displaceable section of the deformable element and the base that faces the absorber across a gap, the radioactive source radioactively emitting charged particles, the deformable element capable of displacing in response to accumulated charge on the absorber such that at a sufficient charge the absorber effectively electrically contacts the source to discharge the absorber and allow the deformable element to return elastically to its initial position; and
   (f) A second electrical generator comprising a betavoltaic cell carried on the deformable element to provide a direct current (DC) electrical potential that can be added to the first electrical generator's electrical potential, such that there is a continuous power output that can be used to provide power to electronic circuits.

2. The power generator of claim 1 wherein the first electrical generator coupled to the deformable element is a piezoelectric transducer secured to the deformable element to deform therewith.

3. The power generator of claim 1 wherein the deformable element comprises a cantilever beam mounted at one end to a mounting block mounted to the base to support the cantilever beam above a surface of the base, the absorber or the source formed on the cantilever beam at a free end of the beam.

4. The power generator of claim 1 wherein the deformable element comprises an elastically deformable bridge mounted to the base at two opposite ends of the bridge and having a central section that can be displaced toward the base by elastically deforming the bridge, the absorber or the source formed on the central section of the bridge.

5. The power generator of claim 1 wherein the deformable element comprises an elastically deformable membrane having a periphery mounted to the substrate with the membranes spaced above a surface of the base, the membrane having a central section that can be displaced toward the base by elastically deforming the membrane, the absorber or the source formed on the central section of the membrane.

6. The power generator of claim 1 wherein the deformable element is formed of a material selected from the group consisting of metal and silicon.

7. The power generator of claim 1 wherein the absorber is formed of a conducting metal.

8. The power generator of claim 1 wherein the material of the source is selected from the group consisting of nickel-63, ruthenium-106, phosphorous-32, phosphorous-33, sulfur-35, calcium-45, and tritium.

9. The power generator of claim 1 wherein the material of the source is nickel-63.

10. The power generator of claim 2 further including a coil connected to the output terminals of the piezoelectric transducer to form a resonant tank circuit therewith.

11. The power generator of claim 10 including a sensor electrically connected between the absorber and the source, the sensor having an electrical resistance that changes with a sensed quantity to thereby affect the time required to charge the absorber sufficiently to deflect the deformable element sufficiently to effectively electrically contact the absorber and the source.

12. The power generator of claim 1 wherein the first electrical generator coupled to the deformable element is a piezoelectric transducer-secured to the deformable element to deform therewith, and including a rectifier connected to terminals of the piezoelectric transducer to rectify the output therefrom to a DC voltage, and a storage capacitor connected to receive the DC voltage from the rectifier.

* * * * *

UNITED STATES PATENT AND TRADEMARK OFFICE
CERTIFICATE OF CORRECTION

PATENT NO. : 7,301,254 B1
APPLICATION NO. : 11/491024
DATED : November 27, 2007
INVENTOR(S) : Amit Lal, Rajesh Duggirala and Hue Li It is certified that error appears in the above-identified patent and that said Letters Patent is hereby corrected as shown below:

In column 1, lines 16 & 17 replace:

"The US Government may have rights in this patent."

With:

"The US Government has certain rights in this patent."

Signed and Sealed this

Third Day of August, 2010

David J. Kappos
*Director of the United States Patent and Trademark Office*